United States Patent
Odgers et al.

(10) Patent No.: US 7,533,027 B2
(45) Date of Patent: *May 12, 2009

(54) METHODS AND APPARATUS FOR UNIQUELY IDENTIFYING A LARGE NUMBER OF FILM PRINTS

(75) Inventors: Chris R. Odgers, Claremont, CA (US); Alan Bell, San Marino, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 1734 days.

This patent is subject to a terminal disclaimer.

(21) Appl. No.: 10/270,922

(22) Filed: Oct. 15, 2002

(65) Prior Publication Data
US 2003/0187679 A1   Oct. 2, 2003

Related U.S. Application Data

(63) Continuation-in-part of application No. 10/115,335, filed on Apr. 2, 2002, now Pat. No. 7,308,430.

(51) Int. Cl.
*H04K 1/00* (2006.01)
(52) U.S. Cl. .................. 705/1; 705/57; 705/58
(58) Field of Classification Search ........... None
See application file for complete search history.

(56) References Cited

U.S. PATENT DOCUMENTS

| 5,862,260 A | 1/1999 | Rhoads |
| 6,314,409 B2 * | 11/2001 | Schneck et al. ............... 705/54 |
| 7,181,625 B2 * | 2/2007 | Peled et al. .................. 713/180 |

* cited by examiner

*Primary Examiner*—John Weiss
*Assistant Examiner*—Michael J Fisher
(74) *Attorney, Agent, or Firm*—Gottlieb, Rackman & Reisman, P.C.

(57) ABSTRACT

A method and apparatus for generating many uniquely identifiable media copies from a few uniquely marked masters to reduce the expense of subjecting each media copy to a marking process while maintaining the ability to trace unauthorized copies back to an authorized source. A number of masters of a film or media presentation are digitally or optically marked with identifiers to distinguish each master from each other master. The identifiers provide the ability to distinguish corresponding partitions or segments among masters. The masters with their identifiers are then duplicated. Final media prints are then assembled by combining segments with the duplicated identifiers from various masters in a manner to form segments with unique identifier sequences. Thus, each final print may be distinguished from each other final print by their identifier sequences.

21 Claims, 6 Drawing Sheets

METHODS AND APPARATUS FOR UNIQUELY IDENTIFYING A LARGE NUMBER OF FILM PRINTS

This application is a continuation-in-part of U.S. patent application Ser. No. 10/115,335 filed on Apr. 2, 2002 now U.S. Pat. No. 7,308,430.

FIELD OF THE INVENTION

The invention relates to the field of methods and apparatus for tracing unauthorized duplication of media assets. More specifically, the invention involves methods and apparatus for duplicating media in a manner to allow each copy to be uniquely identified so that the source of an unauthorized copy can be determined.

BACKGROUND OF THE INVENTION

Media piracy is the source of a substantial loss of revenue for content creators in the entertainment field. The Motion Picture Association of America (MPM) estimates that losses due to piracy worldwide for the U.S. motion picture industry may exceed $3 billion on an annual basis. In order to combat the problem of media piracy, it would be useful if there was a way of uniquely identifying each authorized copy of the media in such a way that any unauthorized copy could be traced back to the authorized copy from which it was made. Unfortunately, the process for the high speed, mass duplication of certain types of media, such as film, does not lend itself to the production of hundreds or thousands of unique copies.

A prior method for marking film prints to facilitate forensic identification exists, and was developed by the Motion Picture Association of America and Kodak employees approximately 15 years ago. This technique was known as "Capcoding." It involved placing visible dots into a spatial matrix on a film frame. Various combinations of the dots/matrix provided approximately 1000 unique codes. The dot matrix was printed onto a release print utilizing a 35 mm slide that had the dot pattern on it. The pattern was printed onto the film at regular intervals. As each print was printed a different 35 mm slide with a different code on it would drop into place.

One problem with this method is that there is no correlation of the dots with scene density/content, so it is possible that some of the dots are not visible, which could result in a misreading of the code. It is also difficult to discern the dots if the (pirated) copy is of poor quality. A further problem is that the 35 mm slides used to print the code are subject to wear and damage, and that the system as designed is limited to approximately 1000 unique codes. As a result of these deficiencies, the Capcode process has not proven popular, although it continues to have some low level of use.

While it is technologically possible to electronically insert a unique identifier, such as a watermark, into a piece of digital media, this must be done N times over to create N uniquely identifiable pieces of media. A number of commercial companies have demonstrated such systems, including IBM, Matsushita Electric, and Digimarc. To add such a mark to a film, the film must first be digitized, the mark inserted, and the digitized film with the added watermark recorded back to film if it is to be projected. This is an expensive and time consuming process, especially considering that it may be necessary to make thousands of uniquely identifiable copies of the media.

It is an object of the present invention to provide a method for forming unique copies of media assets for subsequent identification.

It is a further object to provide such a method while minimizing the cost and time associated with marking in the duplication process to permit efficient mass production of a media asset.

BRIEF DESCRIPTIONS OF THE INVENTION

The present invention is a novel method for piracy deterrence based upon the presence of distinctive identification marks on all authorized copies of an original work or print so that the source of an illegal copy can be traced back to the authorized copy. The method avoids the prior need for subjecting each and every duplicate of a master print to a marking process while still maintaining the ability to uniquely distinguish each duplicate by a unique identifier on the copies. In other words, the method permits mass production of uniquely identifiable media copies or prints by only uniquely marking a small number of duplicates of the original work.

In general, the method starts with several master prints of an audio visual program, motion picture or other entertainment or presentation content. The master prints are marked with unique identifiers. In addition, these marked master prints are partitioned into comparable segments. Each segment includes an identifier so that the segments from one master can be distinguished from the segments of the other masters. Copies are made from these segmented master prints. Final prints are then assembled by uniquely combining segments taken from one or more of the master prints such that each final print has a unique sequence of segment identifiers. In this way, the final prints maintain the entertainment content of the original work and can be mass produced in a distinguishable manner as a result of different combinations of segment identifiers. The method may be accomplished using digital methods and digital mediums as well as using visual methods and analog media such as film.

The invention includes apparatus or systems for generating different combinations of marked and segmented master copes of media assets according to the novel method. One such system includes hardware for distributing copies over an open network, for example, via the world wide web over the Internet. In a request and response system, customers or clients of a network may request or order copies. In response, uniquely combined electronic versions of the marked master copies may be formed and transmitted to the client. The system includes hardware with programmed instructions for accomplishing the method including the recording of customer information and sequence information pertinent to identifying each distributed copy and the recipient thereof.

BRIEF DESCRIPTION OF THE DRAWINGS

The method as more specifically described below is illustrated in the following figures.

DETAILED DESCRIPTION OF THE INVENTION

The production of many uniquely identifiable media copies from only a few different master copies relies on placing marks on the media, and upon the combinatorial nature of an assembly of a complete media from media partitions or a number of segments. Given M uniquely marked copies of the full media asset (such as a movie or any other video or audio content), where the media asset is divided into S segments, it is possible to create $M^S$ uniquely identifiable versions (i.e., distribution media copies) of the media asset as described in more detail below.

Figure 1:
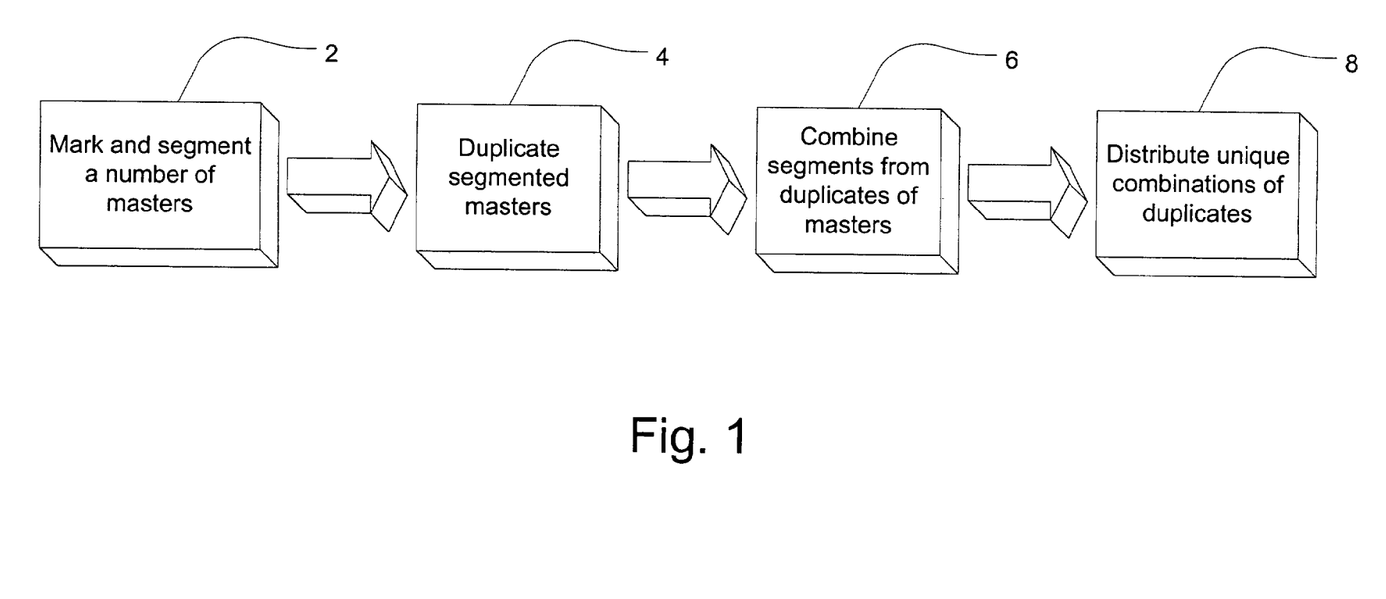
FIG. 1 is a flow chart illustrating the general steps in the method of the invention.

Referring to FIG. 1, the method for producing many unique copies of an original work by marking only a small number of masters initially involves a marking step 2. In general, the masters are duplicates of an original work with a common presentation content. During this step, the masters are marked with a unique identifier. The scope of the marking must be sufficient to permit a distinction between segments or partitions of one master from the corresponding segments or partitions of the other masters. The partitions or segments are chosen in a common fashion relative to all masters so that one segment of one master has a corresponding segment in each other master. With such common partitioning or segmenting, a segment from one master can be replaced by a segment from another master without substantially changing the presentation content of the original work. Thus, with its identifier in all of the segments, each master is distinguishable from all other masters.

It is preferred that the marks are not visually objectionable. Moreover, they must be robust enough to be readable in an unauthorized copy. To these ends, the identifying marks may be visible or invisible. Such a visible mark or identifier might be applied optically in the spatial domain, for example, by including some visual element in the entertainment content of the presentation media that can be distinguished from another version of that content. To this end, the visual element in the case of a film may be the particular color or type of a car that appears in a scene common to each of the masters. In this example, the differences in the car as compared to the other masters would serve as part of the identifier. Other visual marks, such as the dots or marks of a Capcoding or similar process might also be used.

Alternatively, the identifier might be applied electronically in the digital domain. One such identifier may be a digital watermark contained in an audio or video portion of an electronic media asset. In the case of film, the film could be digitized and an invisible mark could be created by adding a digital watermark to the digital intermediary and then printing the watermarked digital intermediary back to film. Alternately, an inaudible digital watermark could be applied to the soundtrack of the media asset. Such methods are known in the art.

In a duplicating step 4, all of the marked masters are then duplicated using an appropriate duplication process. Each duplicate need not be subjected to a new marking process. However, the intermediate copies resulting from this duplication process should maintain the identifiers of the masters from which the copies are made. Thus, the intermediate copies have duplicated the unique identifiers. The copying process will result in a set of intermediate copies for each master version. Each intermediate copy in one set would not generally be distinguishable from the intermediate copies because of the duplicated identifier in that set, but each copy in one set would be distinguishable from the copies of the other sets. In this step, no more than $M^S/M$ copies of each master should be made. This number of intermediate copies is sufficient to maximize the number of unique final or distribution copies that could be generated. Since the total possible number of unique distributable copies is $M^S$ (M=number of masters and S=number of segments) $M^{S-1}$ are all that is needed for each master. Any more copies will result in unnecessary intermediate media copies because if they are used, the resulting media copies would not be distinguishable from other distributable copies. Of course, fewer copies can be made.

In a combining step 6, the invention utilizes the marked and segmented sets of intermediate copies to generate final or distributable media copies that are uniquely distinguishable from each other despite the fact that only a relatively small number of masters were uniquely marked in the first instance. As previously noted, each master is segmented or partitioned. In this combining step 6, segments from the duplicated sets are assembled in a combinatorial fashion. The goal of the step is to combine the segments so that each resulting or assembled copy has all of the partitions or segments that constitute the whole entertainment or presentation content common to all of the masters. However, by using different combinations of segments or partitions from various masters, a unique identifier sequence exists in each assembled or distribution copy such that it can be distinguished from all other assembled copies. This is true even though the segments have duplicated identifiers, copied from the uniquely marked masters.

In a distributing step 8, these final uniquely distinguishable combined or assembled copies of the original work may then be mass distributed as authorized copies. To enable the tracking of the authorized copies, the identifier sequence of each final copy should be recorded and associated with the authorized recipient so that a later discovered unauthorized copy can be traced back to the authorized recipient by the identifiers on the unauthorized copy.

With the invention described, it is only necessary to produce a very small number of uniquely marked media masters in order to produce a very large number of uniquely identifiable distribution media copies. In an example of a master partitioned into six segments, the problem of producing 46,656 uniquely identifiable complete final copies has been reduced by four orders of magnitude (to that of producing only six uniquely marked copies of the master). The table below further illustrates the power of this technique:

Table of the Number of Uniquely Identifiable Copies Producible

| Number of Uniquely Marked Media Masters | Number of Segments | | | | | | |
|---|---|---|---|---|---|---|---|
| | 1 | 2 | 3 | 4 | 5 | 6 | 7 |
| 1 | 1 | 1 | 1 | 1 | 1 | 1 | 1 |
| 2 | 2 | 4 | 64 | 16 | 32 | 64 | 128 |
| 3 | 3 | 9 | 27 | 81 | 243 | 729 | 2187 |
| 4 | 4 | 16 | 64 | 256 | 1024 | 4096 | 16384 |
| 5 | 5 | 25 | 125 | 625 | 3125 | 15625 | 78125 |
| 6 | 6 | 36 | 216 | 1296 | 7776 | 46656 | 279936 |
| 7 | 7 | 49 | 343 | 2401 | 16807 | 117649 | 823543 |
| 8 | 8 | 64 | 512 | 4096 | 32768 | 262144 | 2097152 |

Figure 2:
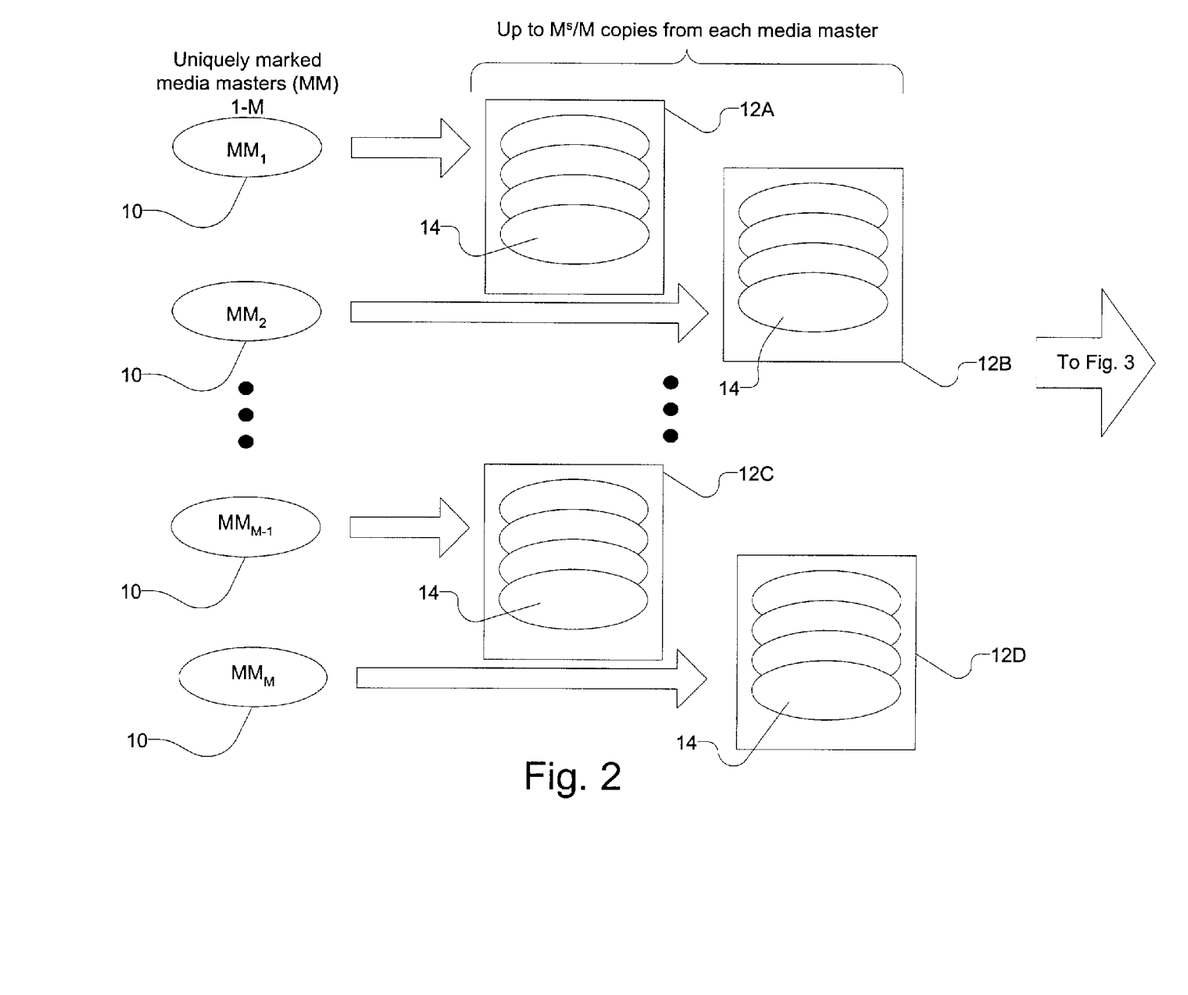
FIG. 2 illustrates some steps in a preferred method for marking and duplicating film prints using the method of FIG. 1.
Figure 3:
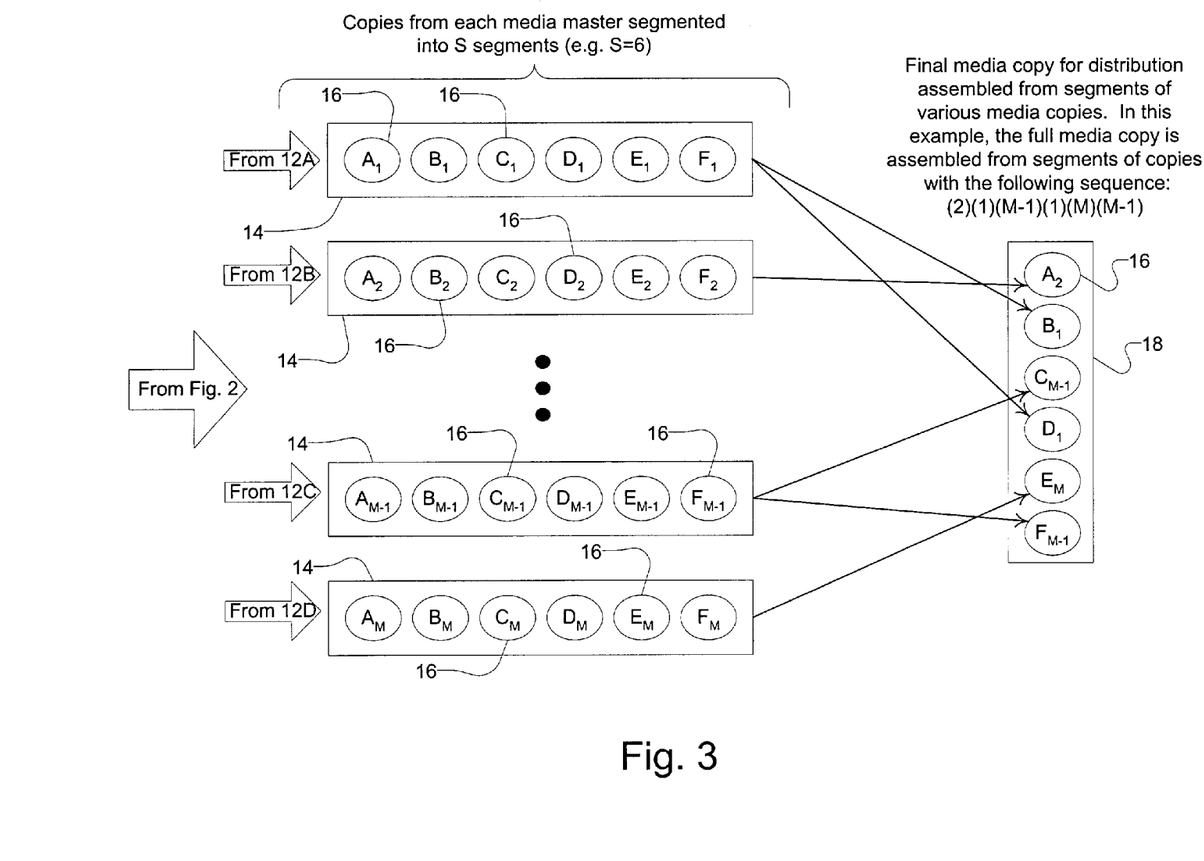
FIG. 3 depicts the remaining steps of the method of FIG. 2.

The details of the invention are further illustrated in the following example involving the distribution of movie films. With reference to FIGS. 2 and 3, a movie that was made up of six sequential reels (S=6) could be produced in six uniquely marked master versions (M=6). Each uniquely marked master version 10 of the film would be produced in such a way that when the film is subdivided into segments 16 (reels), each segment 16 would still contain the unique mark. For example, all the reels which make up the first set 12A of intermediate copies 14 of the first marked version (shown as $MM_1$ in FIG. 2) might be encoded with the value "1" (shown as $A_1 \ldots F_1$ in FIG. 3), all the reels which make up the second set 12B of intermediate copies 14 from the second marked version (shown as $MM_2$ in FIG. 2) might be encoded with the value "2" (shown as $A_2 \ldots F_2$ in FIG. 3), and so on. Each final full distribution print or final copy 18 of the film would be re-assembled from segments 16 in such a way that the sequence of the marks contained in the combined reels would constitute an identifier for the entire film (e.g. 2-1-5-1-6-5) (shown as $A_2$-$B_1$-$C_{M-1}$-$D_1$-$E_M$-$F_{M-1}$ in FIG. 3), and each full print would be identified by a unique identifier sequence. By using each possible identifier sequence only once, a unique identifier, or serial number, for the film is created. Segment numbers representative of or associated with the actual identifier could be printed on the media in an easy-to-read form to facilitate identification of each segment for the assembly process.

For the six reel film example, with six unique master versions, $6^6$, or 46,656 uniquely identifiable finished versions of the film could be produced. The six uniquely marked copies of the film could be mass duplicated by standard procedures, and the unique reel sequences assembled prior to distribution.

For distribution of multiple copies to a single exhibitor, care would have to be taken to ensure that S minus 1 segments of all copies of the film provided to the exhibitor are marked identically, with only one segment marked differently. This would ensure that if the exhibitor interchanged segments (reels) of the film, they would not generate an identification sequence that had been sent to another exhibitor. For example, three copies of a six reel film sent to an exhibitor might be identified 2-1-5-1-6-3, 2-1-5-1-6-4, and 2-1-5-1-6-5. Interchanging any of the reels could only result in a sequence beginning with 2-1-5-1-6 and so could not produce a numeric identification sequence which had not originally been provided to the exhibitor.

The mark detection process on pirated copies of the distribution copies or prints would be performed either by inspection, in the case of optical marks, or by an electronic system, in the case of digital watermarks. If a record by serial number associated with the identifier sequence was kept of the location that originally exhibited each media copy, it would be possible to determine the source from which an unauthorized copy was made.

While the above example is based on film media that are traditionally projected, the technique is also applicable to media that remains in the digital domain, i.e., for distribution on digital cinema systems. To this end, replication of final copies need not rely upon a strict separation between the duplication step 4 and the combining step 6. Thus, the copying of a unique set of segments 16 from masters 10 for assembly of a final distribution copy 18 may be performed substantially contemporaneously.

Figure 4:
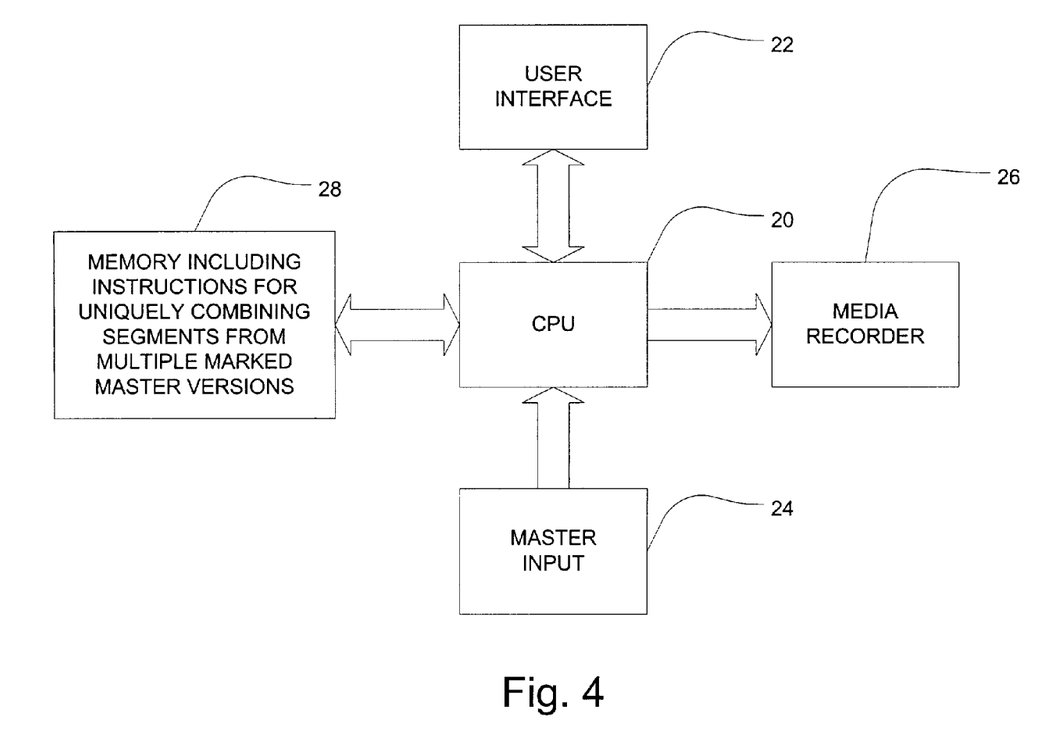
FIG. 4 shows an apparatus for implementing one embodiment of the method of the invention.

An apparatus or system as illustrated in FIG. 4 may be programmed to accomplish the above described invention. The apparatus includes a central processing unit (CPU) 20, a user interface 22 or other input/output devices, master media input 24, a media recorder 26, and a memory 28. The memory has programmed instructions or software for the CPU to control the duplication method where one or more masters 10 are loaded into the system via the master media input 24. These masters may be marked in the system or pre-marked by another system. If a single master is loaded, uniquely marked masters may be generated using the CPU 20. The CPU 20 in response to commands from the user interface 22 then controls the media recorder 26, for example, a DVD writer or other recording device, to generate final copies of the masters from the master media input 24 or the memory 28 in a manner to uniquely combine segments as previously described from the uniquely marked masters while preserving the overall presentation content. The CPU 20 in accordance with instructions from the memory 28 would store or keep track of each used segment sequence from the final copies to avoid generating final copies with a particular segment sequence more than once.

Figure 5:
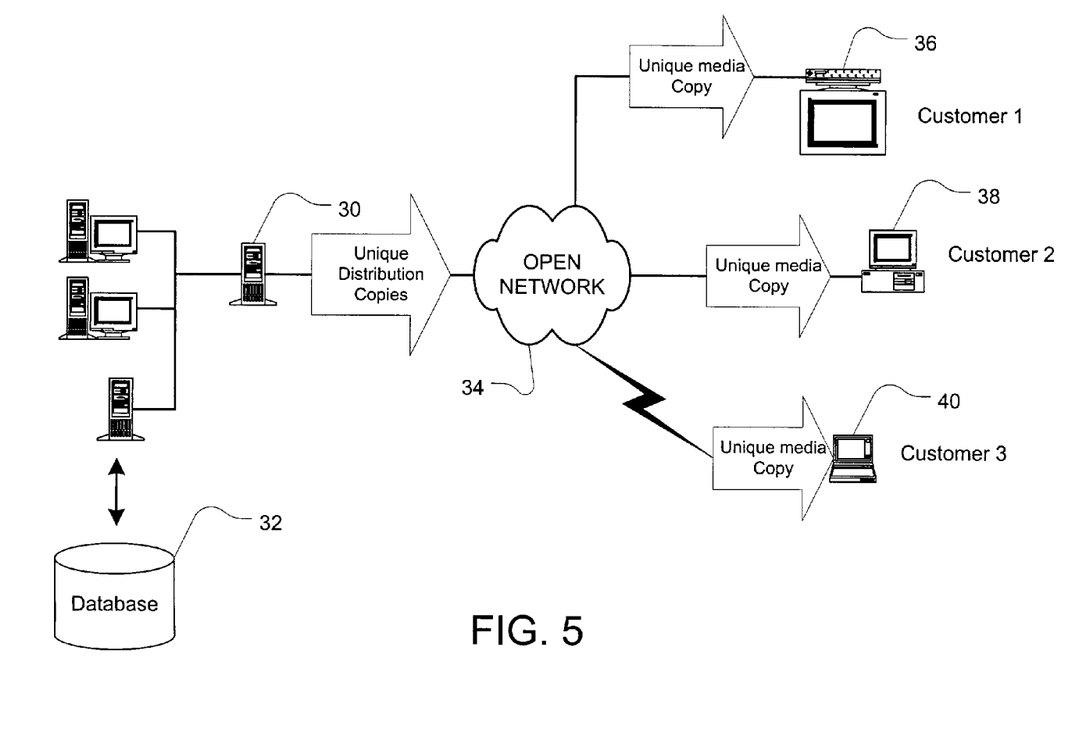
FIG. 5 depicts one embodiment of a networked apparatus for implementing the invention over a network.

The invention may also be implemented for delivery of unique distribution copies over an open and/or private network. With reference to FIG. 5, a distribution server 30 with access to a database 32 or other data storage arrangement can accept orders or requests over an open network 34 from customers 36, 38, 40 (i.e., clients of the open network) for distribution of unique media copies to each user/customer.

Figure 6:
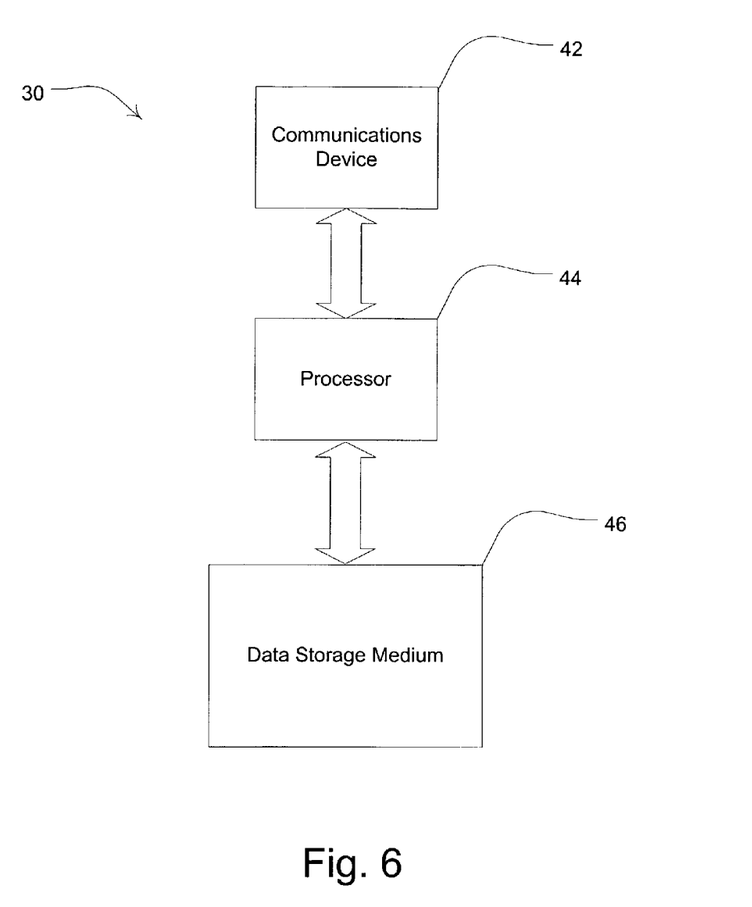
FIG. 6 is a block diagram of an illustrative embodiment of a distribution server for implementing the system of FIG. 5.

As illustrated in FIG. 6, the distribution server 30, which may optionally include the features of the apparatus of FIG. 4, can communicate with customers over an open network through a communications port 42 or communications device, for example, a network interface card, under the control of a computer or processor 44. The port or device is coupled to the server and the open network. The distribution server 30 is linked or otherwise has access to a data storage medium 46 such as a hard disk drive, that may include data stored in, for example, a database 32. The distribution server 30 is programmed with instructions to access a number M of uniquely marked electronic versions of the media master stored as data in the database 32. These electronic versions would also be segmented into S segments. Upon receiving a request for a copy of the media from a customer, the distribution server 30 would generate an identifiable distribution copy by combining S segments from the M electronic versions as previously described herein. By this process, fewer marked copies may be stored on the system when compared to systems requiring a marking process for each copy since distribution copies may be generated as needed by copying and combining segments from previously marked copies rather than generating new copies with new markings. The process also saves time since generating new markings may be a more time consuming process for the distribution server 30 when compared to the time the distribution server 30 takes to simply copy and combine different segments.

In a response to the request of the customer, the distribution copy would then be transmitted by the distribution server 30 through the communications port 42 over the open network 34 to the requesting customer. Such distribution may be accomplished, for example, by streaming or otherwise downloading a data file containing the distribution copy. Preferably, when necessary, the transmission would use some secure transmission protocol or other encryption/decryption protocol. The distribution server 30 would record or otherwise keep track of the identifying sequence of each delivered distribution copy and the customer requesting the copy by recording the information on the data storage medium 46, in the database 32 or another database or data storage format. Preferably, only a single customer would receive a distribution copy with any particular sequence so that unauthorized copies of the distribution copy are easily traced back to the customer.

For these purposes, a single computer may serve as the distribution server 30. However, the functioning of the distribution server 30 can also be accomplished with several devices or computers that work together on a private or local area network or with several devices or computers working in conjunction with each other over an open network.

As previously described, the distribution copies are transmitted by the distribution server 30 over the open network 34. The open network may be a communications network or wide area network connecting many devices, multiple local area networks and/or other points of presence (POPs) that provide access to the open network to the public at large. Such an open network may include for example, an internet. An open network generally uses a common information transmission protocol. One such open network is the global Internet which uses the TCP/IP protocol. Data transmission with or through the open network may be conducted over optical fibers, coaxial cable or other equivalent and may optionally include wireless transmissions. As previously noted, the transmission of the distribution copies over the open network may be encrypted to impede unauthorized access. Protocols for encryption/decryption or other encrypted data streams are known and may include, for example, IP Security (IPsec) and the Point-to-Point Tunneling Protocol (PPTP).

Customers 36, 38, 40 then may view or otherwise use the distribution copy delivered to it whether the copy is received by the user on a portable computing device 40, computer 38 or cable or satellite television device 36. Of course, while these customers may be exhibitors that will exhibit their copy to other viewers, the customers may also be one-time viewers. Nevertheless, since the distribution copy includes a identifiable sequence, any subsequently discovered unauthorized copies made from the distributed copy may be traced back to the original customer since the sequence and its association with the receiving customer were recorded by the distribution server 30.

Although the invention has been described with reference to particular forms, it is to be understood that these are merely illustrative of an application of the principles of the invention. Numerous modifications, may be made and other arrangements may be devised without departing from the spirit and scope of the invention.

The invention claimed is:

1. A system for distributing uniquely identifiable copies of a media asset comprising:
    a distribution server;
    a communications device coupled to said distribution server and an open network;
    a data storage medium linked to said distribution server, said data storage medium comprising data representing a plurality of unique master copies of a common presentation content having commonly partitioned segments with identifiers;
    wherein said distribution server comprises programmed instructions to receive a request from said open network and send a response to said open network through said communications device using a transmission protocol of said open network;
    wherein said response comprises a distribution copy of said media asset formed by combined segments copied from different master copies such that (a) the distribution copy contains said common presentation content, and (b) said combined segments of the distribution copy can be uniquely distinguished from combined segments of other distribution copies by sequences of said identifiers when a number of said other distribution copies exceeds the plurality of unique master copies.

2. The system of claim 1 wherein said common presentation content is a motion picture.

3. The system of claim 2 wherein said open network is an internet.

4. The system of claim 3 wherein said transmission protocol is TCP/IP.

5. The system of claim 4 wherein said distribution server further comprises programmed instructions for sending no more than a number of distribution copies equal to a total number of master copies raised to an exponent of a total number of said commonly partitioned segments.

6. The system of claim 5 wherein said data storage medium includes a database of said sequences of said identifiers associated with customers from said open network.

7. The system of claim 6 wherein said identifiers include a digital watermark.

8. A system for distributing uniquely identifiable copies of a media asset comprising:
    a distribution server with a communications device coupled to an open network; and
    a data storage medium linked to said distribution server, said data storage medium comprising data representing a plurality of unique master copies of a common presentation content having commonly partitioned segments with identifiers;
    wherein said distribution server comprises programmed instructions to receive a request and send a response to said open network through said communications device using a transmission protocol of said open network;
    wherein said distribution server further comprises programmed instructions to generate distribution copies of said media asset for transmission to a client of said open network, said distribution copies formed by assembling duplicated segments from different unique master copies to form assembled copies of said common presentation content wherein said assembled copies have different identifier sequences.

9. The system of claim 8 wherein said common presentation content is a motion picture.

10. The system of claim 9 wherein said open network is an internet.

11. The system of claim 10 wherein said transmission protocol is TCP/IP.

12. The system of claim 11 wherein said distribution server further comprises programmed instructions for sending no more than a number of distribution copies equal to a total number of master copies raised to an exponent of a total number of said commonly partitioned segments.

13. The system of claim 12 wherein said data storage medium includes a database of said identifier sequences associated with customers from said open network.

14. The system of claim 13 wherein said identifiers include a digital watermark.

15. A system for distributing uniquely identifiable copies of a media asset comprising:
    a control means for processing requests and generating responses for a client of an open network;
    a means for transmitting said responses and receiving said requests to and from said open network;
    a storage means for data storage linked to said control means, said storage means comprising data representing a plurality of unique master copies of a common presentation content having commonly partitioned segments with identifiers;
    wherein said control means comprises programmed instructions to receive a request and send a response to said open network through said means for transmitting using a transmission protocol of said open network;
    wherein said response comprises a distribution copy of said media asset formed by combined segments copied from different master copies such that (a) the distribution copy contains said common presentation content, and (b) said combined segments of the distribution copy can be uniquely distinguished from combined segments of other distribution copies by sequences of said identifiers when a number of said other distribution copies exceeds the number of uniquely marked master copies.

16. The system of claim 15 wherein said common presentation content is a motion picture.

17. The system of claim 16 wherein said open network is an internet.

18. The system of claim 17 wherein said transmission protocol is TCP/IP.

19. The system of claim 18 wherein said distribution server further comprises programmed instructions for sending no more than a number of distribution copies equal to a total number of master copies raised to an exponent of a total number of said commonly partitioned segments.

20. The system of claim 19 wherein said data storage medium includes a database of said sequences of said identifiers associated with customers from said open network.

21. The system of claim 20 wherein said identifiers include a digital watermark.

* * * * *